H. D. GREENE.
NON-SKID TIRE GRIP.
APPLICATION FILED MAY 6, 1916.
1,241,621. Patented Oct. 2, 1917.
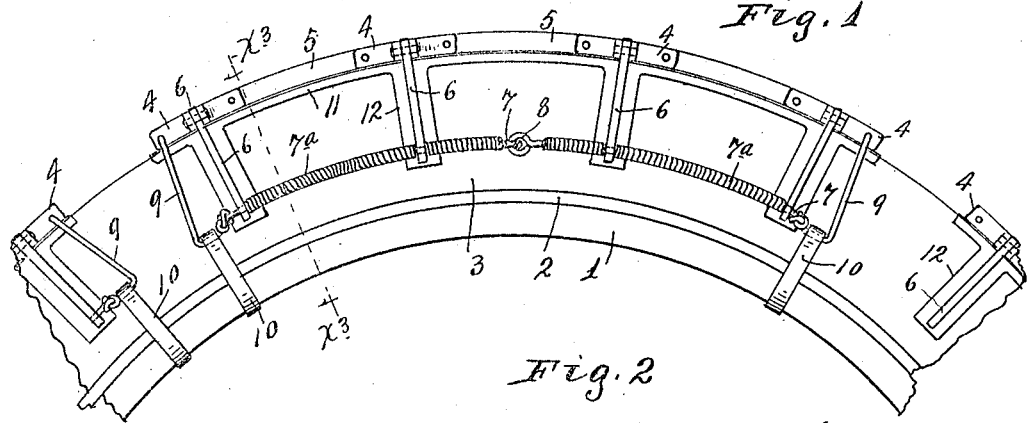
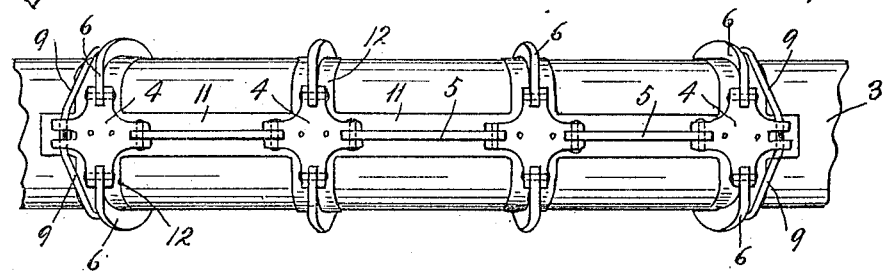
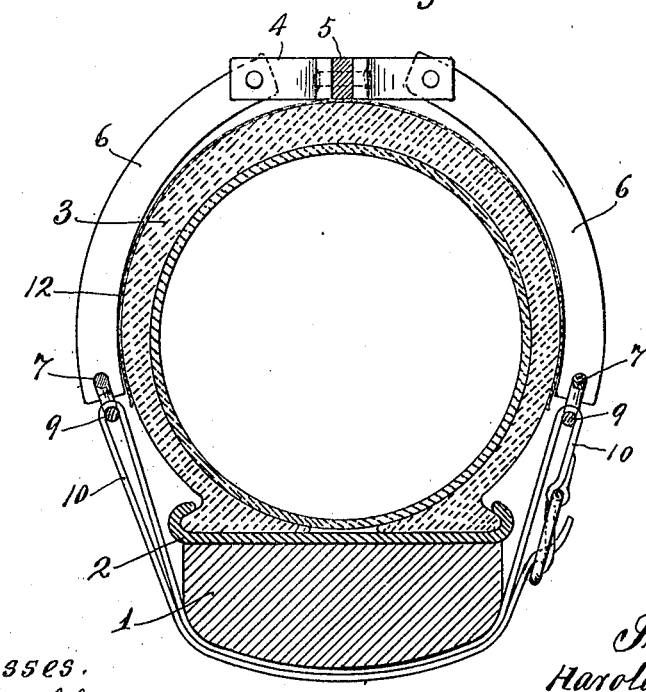
Witnesses.
A. H. Opsahl
E. C. Wells
Inventor
Harold D. Greene
By his Attorneys
Williamson Merchant

UNITED STATES PATENT OFFICE.

HAROLD D. GREENE, OF BRITT, IOWA.

NON-SKID TIRE-GRIP.

1,241,621.

Specification of Letters Patent.

Patented Oct. 2, 1917.

Application filed May 6, 1916. Serial No. 95,789.

*To all whom it may concern:*

Be it known that I, HAROLD D. GREENE, a citizen of the United States, residing at Britt, in the county of Hancock and State of Iowa, have invented certain new and useful Improvements in Non-Skid Tire-Grips; and I do hereby declare the following to be a full, clear, and exact description of the invention, such as will enable others skilled in the art to which it appertains to make and use the same.

My present invention has for its object to provide an extremely simple and highly efficient non-skid grip or tread applicable to pneumatic and other forms of tires, and especially serviceable on automobiles, and auto trucks. The invention is in the nature of an improvement on, or modification of the tire grip disclosed and claimed in my pending application, S. N. 81,364, filed of date March 1, 1916, and the particular object of the invention is to increase the flexibility of tire grips of the character disclosed and broadly claimed in my said prior application.

In the accompanying drawings which illustrate the invention, like characters indicate like parts throughout the several views.

Referring to the drawings:

Figure 1 is a side elevation showing the rim of a vehicle wheel equipped with a pneumatic tire, having my improved tire grip applied thereto;

Fig. 2 is a plan view of the parts shown in Fig. 1; and

Fig. 3 is an enlarged transverse section taken on the line $x^3$ $x^3$ of Fig. 1.

The numerals 1, 2, and 3 indicate respectively the felly, the rim, and the pneumatic tire of an automobile wheel.

The non-skid tire grip, so-called, is preferably made up of a multiplicity of circumferentially spaced tread sections that are independently securable to the wheel. Each such section comprises a centrally located circumferentially extended jointed tread bar made up of tread blocks 4 and connecting links 5 pivotally connected thereto. To the said tread blocks 4, curved transversely extended tread bars 6 are pivotally connected at their radially outer ends. The radially inner ends of the transverse tread bars 6 and at each side of the tire are tied together by spacing rods 7. Said spacing rods 7 are shown as provided with flexible intermediate joints at 8, and at their ends they are connected to the ends of the anchor rods 9. They are passed through perforations in the outer ends of the end of the tread blocks 4 of the tread section. By means of buckle straps 10 passed through the loops of the anchor rods 9 and between the spokes of the wheel, the tread sections may be anchored to the wheel, and held against circumferential creeping movements thereon.

Said spacing rods 7 are provided with stops or spacing devices for spacing the engaged ends of the transverse tread bars 6 and these are shown formed by coiled wire spacing sleeves $7^a$ passed around said rods between the said tread bars. Obviously other forms of stops or spacing devices might be provided. The said spacing rods have sufficient flexibility to permit independent pivotal movements of the tread bars 6 under the movement of the wheel and the action of the load on the tire.

Tread sections constructed in this manner will have both transverse and circumferential flexibility so that they will yield and adapt themselves to the tire and hence, neither destroy the elasticity of the tire nor produce intense strains on the elements of the non-skid tire grip. Furthermore, they leave very considerable portions of the tire exposed for engagement with the ground when running on soft roads.

To decrease the wear between the tire and the jointed sections of the tire grip, a flexibly turned sheet metal saddle plate is interposed between the said tire and tread members. This saddle plate 11 as shown comprises a circumferential strap located under the tread links 5 and blocks 4 and provided with curved laterally extended flexible arms 12 located under the transverse tread bars 6. Preferably the said saddle plate would be riveted or otherwise secured to the tread blocks 4. However, this so-called saddle plate is not an absolutely essential feature.

What I claim is:

1. A non-skid tire grip made up of a centrally located jointed circumferentially extended tread bar and curved laterally extended tread bars pivoted thereto, flexible spacing devices connecting the ends of said transverse tread bars, and means for securing said tire grip to a wheel rim and tire 3.

2. A non-skid tire grip made up of a centrally located jointed circumferentially extended tread bar and curved laterally extended tread bars pivoted thereto, and a flexible saddle plate comprising a central circumferential strip and laterally projecting strips, the former being located under the circumferentially connected tread members, and the latter being located under said transverse tread bars.

3. A non-skid tire grip made up of a multiplicity of flat tread blocks with longitudinally and laterally projecting pivot lugs, relatively narrow circumferentially extended tread links pivotally connected at their ends to the longitudinal lugs of said tread blocks, curved circumferentially spaced transversely extended tread bars pivotally connected to the transverse pivot lugs of said tread blocks, and spacing devices flexibly connecting the extended ends of said tread bars, and said tread links and tread bars being relatively very narrow, as compared with said tread blocks.

In testimony whereof I affix my signature in presence of two witnesses.

HAROLD D. GREENE.

Witnesses:
E. P. HEALY,
M. MOLLOY.

Copies of this patent may be obtained for five cents each, by addressing the "Commissioner of Patents, Washington, D. C."